US006469815B1

(12) United States Patent
Poon et al.

(10) Patent No.: US 6,469,815 B1
(45) Date of Patent: Oct. 22, 2002

(54) INTER-SATELLITE OPTICAL LINK ACQUISITION SENSOR

(75) Inventors: Chie W. Poon, Torrance, CA (US); Robert C. Carden, III, Orange, CA (US); Robert M. Englekirk, Pacific Palisades, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/301,297

(22) Filed: Apr. 28, 1999

(51) Int. Cl.⁷ .............................................. H04B 10/00
(52) U.S. Cl. ...................... 359/159; 359/172
(58) Field of Search ................. 359/154, 172, 359/193, 159

(56) References Cited

U.S. PATENT DOCUMENTS

| | | | |
|---|---|---|---|
| 3,504,182 A | 3/1970 | Pizzurro et al. ............. | 359/114 |
| 3,511,998 A | 5/1970 | Smokler ...................... | 359/171 |
| 4,017,146 A | 4/1977 | Lichtman ...................... | 350/7 |
| 4,982,445 A | 1/1991 | Grant et al. ................. | 455/606 |
| 5,030,004 A * | 7/1991 | Grant et al. ................. | 356/153 |
| 5,039,194 A * | 8/1991 | Block et al. ................ | 350/96.1 |
| 5,060,304 A | 10/1991 | Solinsky ...................... | 359/152 |
| 5,062,150 A | 10/1991 | Swanson et al. ............ | 359/152 |
| 5,282,073 A | 1/1994 | Defour et al. ............... | 359/159 |
| 5,390,040 A | 2/1995 | Mayeux ....................... | 359/152 |
| 5,475,520 A | 12/1995 | Wissinger .................... | 359/172 |
| 5,486,690 A | 1/1996 | Ake ........................... | 250/206.1 |
| 5,592,320 A | 1/1997 | Wissinger .................... | 359/159 |
| 5,710,652 A | 1/1998 | Bloom et al. ................ | 359/152 |
| 5,953,146 A * | 9/1999 | Shelby ........................ | 359/159 |
| 6,122,084 A * | 9/2000 | Britz et al. .................. | 359/172 |
| 6,178,024 B1 * | 1/2001 | Degura ....................... | 359/159 |
| 6,268,944 B1 * | 7/2001 | Szapiel ....................... | 359/159 |
| 6,271,953 B1 * | 8/2001 | Dishman et al. ............ | 359/172 |
| 6,297,897 B1 * | 10/2001 | Czichy et al. ............... | 359/172 |
| 6,304,354 B2 * | 10/2001 | Carlson ....................... | 359/172 |
| 6,323,980 B1 * | 11/2001 | Bloom ........................ | 359/159 |

FOREIGN PATENT DOCUMENTS

| | | |
|---|---|---|
| EP | 0 482 472 A2 | 10/1991 |
| EP | 0 504 022 A1 | 3/1992 |
| EP | 0 847 149 A1 | 8/1997 |
| EP | 0 863 627 A1 | 10/1997 |
| EP | 0 876 013 A1 | 12/1997 |
| EP | 0 883 253 A1 | 6/1998 |
| EP | 0 887 656 A1 | 9/1998 |

* cited by examiner

*Primary Examiner*—Leslie Pascal
*Assistant Examiner*—Dalzid Singh
(74) *Attorney, Agent, or Firm*—McAndrews, Held & Malloy, Ltd.

(57) ABSTRACT

The present invention provides an acquisition sensor and system to align the communication lasers of two satellite communication terminals so that the satellites acquire one another to allow laser communication. The communications lasers of both satellites are scanned over their respective pointing uncertainty regions. Each satellite's acquisition sensor detects the presence of the scanned beam of the other satellite and provides positional resolution of the other satellite. Each satellite than adjusts its scanning to conform with the new positional data. of the other satellite. The acquisition sensor is a quadrant InGaAs photo-detector and accompanying monolithic acquisition processing circuitry sealed in a hermetic package with an optical window. Each quadrant of the sensor is responsive to the beam of the other satellite, thus providing positional resolution of the other satellite to the space of a single quadrant. Once the Field of View (FOV) of the acquisition sensor has realigned, the positional resolution repeats until the other satellite's tracking sensor is illuminated.

20 Claims, 13 Drawing Sheets

INTER-SATELLITE OPTICAL LINK ACQUISITION SENSOR

BACKGROUND OF THE INVENTION

The present invention generally relates to an optical communication system for acquiring an optical link between terminals. More particularly, the present invention relates to an acquisition sensor for such a system including a multi-channel photodetector for use in acquiring an optical link between terminals.

At least two communication terminals are involved in laser communications, a transmitting terminal and a receiving terminal. The transmitting terminal transmits the optical signal (such as laser energy) which is received by the receiving terminal. The receiving terminal receives the optical signal with a detector such as a photodetector.

One of the difficulties in long-distance laser communication between a transmitting terminal and a receiving terminal is the initial alignment of the optical transmitting source and the receiving detector of the two communication terminals. For example, if the optical transmitting source is a laser, the laser from the transmitting terminal must be pointed so that the laser is incident on the detector of the receiving terminal. When the separation between satellites is great (for instance, thousands of kilometers), this initial alignment and acquisition may be quite challenging. In addition to the wide separation between terminals, the laser beam itself may be quite narrow, further adding to the challenge. The narrowness of the laser beam arises because of the power constraints inherent in satellite communications. Wider beams require more power which in turn adds to satellite weight, cost and size.

Many prior systems used one or more laser beacons to align communication satellites with respect to each other. Multiple laser beacons increase cost in terms of both the size and weight of the satellite and the power consumption of the beacon. Other systems relied on hyper-accurate initial positioning, which may not be achievable when the separation between terminals is large and may be easily disrupted by spacecraft jitters.

Thus, a need has long existed for an acquisition system and sensor that minimizes power consumption and additional weight and size while providing reliable and fault tolerant acquisition within a short time.

SUMMARY OF THE INVENTION

One object of the present invention is to provide an optical acquisition sensor for use in an acquisition system that eliminates the laser beacon signal that must be provided in several prior systems.

Another objective of the present invention is to minimize the cost, complexity, size, weight, and power consumption of the hardware used to provide an acquisition system and sensor.

One or more of the foregoing objects are met in whole or in part by the inter-satellite optical link acquisition sensor of the present invention. The present invention provides an acquisition sensor and system for acquiring an optical beam transmitted by a source located in a region of uncertainty. A source (transmitted) optical signal is scanned and the acquisition sensor is employed on a receiving terminal to look for the scanning beam. Based on the information from the acquisition sensor, the Field of View (FOV) and region of uncertainty of the receiver can be adjusted accordingly to establish the communication link.

The acquisition sensor includes a multi-channel photodetector, channel circuitry, a threshold circuit, a comparator and filtering. The received optical signal is converted to an electrical signal and supplied to channel circuitry. The channel circuitry includes a threshold circuit supplying a threshold signal. The received electrical signal is compared to the threshold signal and, if the received signal exceeds the threshold, a hit is detected.

These and other features of the present invention are discussed or apparent in the following detailed description of the preferred embodiments of the invention.

DETAILED DESCRIPTION OF THE PREFERRED EMBODIMENTS

Figure 1:
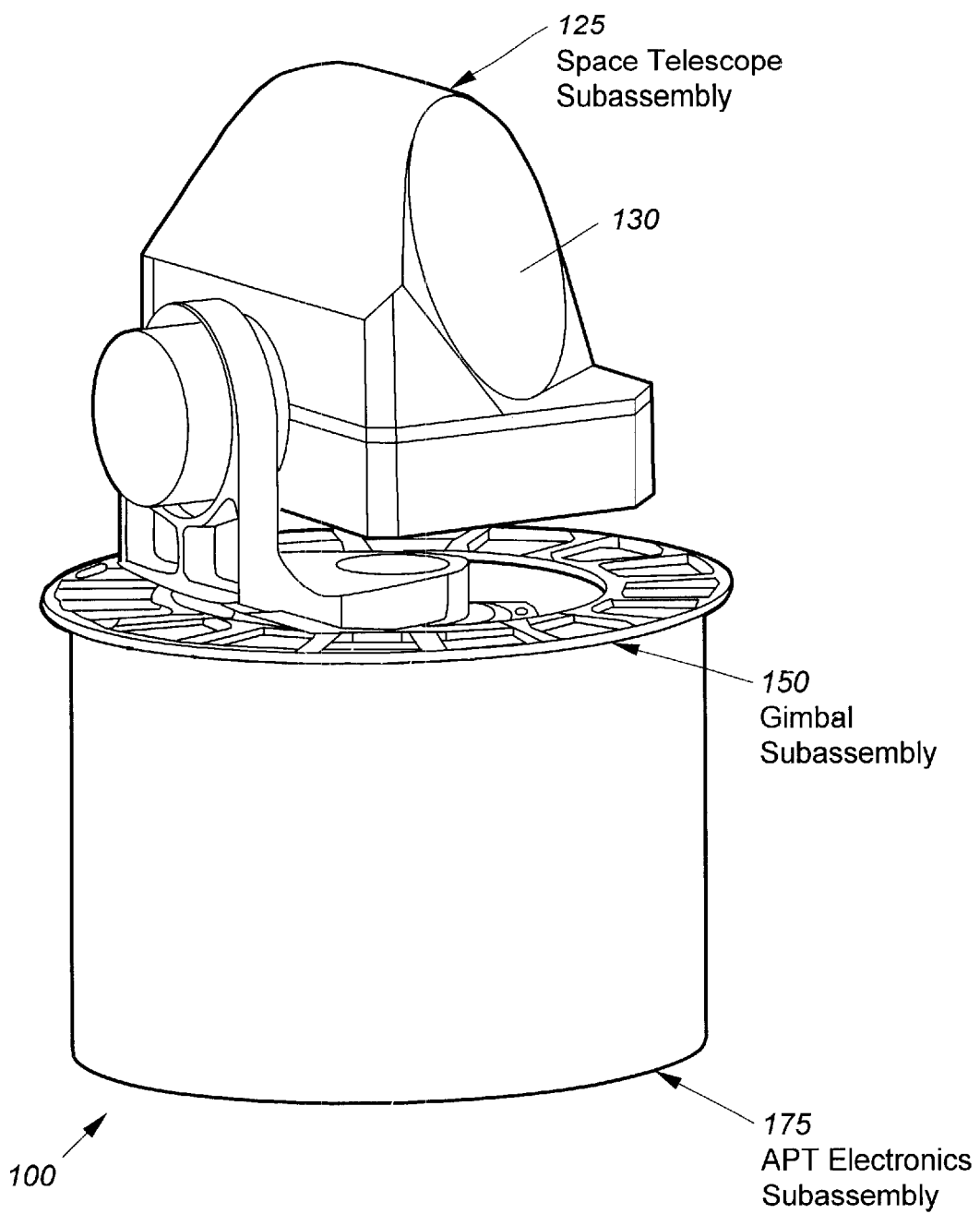
FIG. 1 illustrates the Gimballed Telescope Assembly (GTA) of the present invention.

FIG. 1 shows a Gimballed Telescope Assembly (GTA) 100 of the present invention. The GTA 100 includes a Space Telescope Subassembly (STS) 125, 1 Gimbal Subassembly 150, and an Acquisition Pointing and Tracking (APT) Electronics Subassembly 175. The preferred embodiment of the GTA includes a two-axis gimballed 15 cm diameter telescope and associated sensors, mechanisms, and control electronics required for acquisition, pointing and tracking.

The STS 125 contains the telescope and an optical bench holding the transmit, receive, acquisition, and tracking components. The gimbal subassembly 150 provides the required azimuth and elevation range of motion and tracking slew rate to the STS 125. The transmit and receive signals are carried to the STS 125 through the gimbal subassembly 150 on optical fibers. The APT electronics subassembly 175 provides acquisition/pointing/tracking control.

As will be explained in greater detail below, incident laser energy passes through the protective window 130 of the STS 125 to the interior of the STS 125 where it is received and processed. Additionally, the satellite upon which the GTA 100 is mounted may transmit laser energy through the protective window 130 of the STS 125. The protective window serves to isolate the interior of the STS 125 from the harsh space environment.

Figure 2:
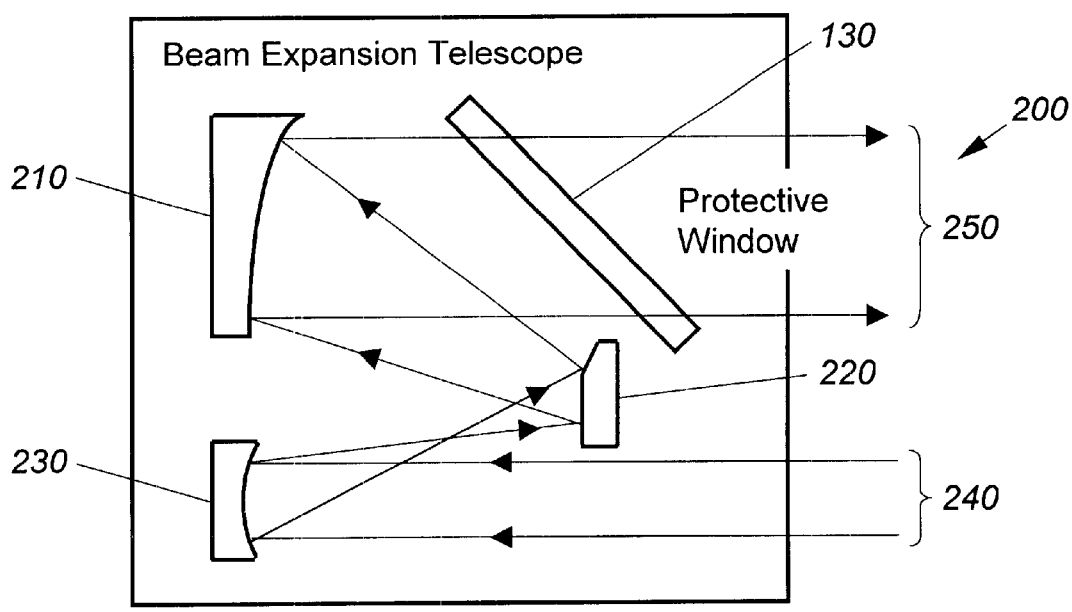
FIG. 2 illustrates the Beam Expansion Telescope (BET) of the Space Telescope Subassembly (STS).

The STS 150 is comprised of a Beam Expansion Telescope (BET) 200, and the associated transmit, receive, acquisition, and tracking components mounted on an optical bench. FIG. 2 illustrates the BET 200 of the STS 125. The BET includes a first mirror 210, a second mirror 220, and a third mirror 230. The three mirrors are positioned in a Three Mirror Anastigmat (TMA) configuration relative to each other and the incident laser energy.

In operation, the BET 200 expands the outgoing laser beam and collects the incoming light. The outgoing laser beam enters the BET 240 and is incident upon the third mirror 230. The path and orientation of the outgoing beam is shown by rays 240. The outgoing beam is reflected from the third mirror 230 and redirected to the second mirror 220. The second mirror 220 reflects the incident beam onto the first mirror 210. The first mirror 210 reflects the incident beam through the protective window 130 and into the space environment. The path of the laser beam as it exits the BET 200 through the protective window 130 of the STS 125 is indicated by rays 250. Because of the relative focal radii and optical properties of the mirrors (210–230) the outgoing beam is expanded to a desired size.

An incoming laser beam follows the same path as the outgoing laser beam, but in reverse. The incoming laser beam passes through the protective window 120 to the first mirror 210 where it is reflected to the second mirror 220 which reflects the incoming laser beam to the third mirror 230 which reflects the beam out of the BET 200.

The preferred embodiment of the BET 200 uses an all-reflective Three Mirror Anastigmat (TMA) with an on-axis magnification of 7.5 and an effective collection area of 177 $cm^2$. The optical components are preferably diamond-turned, enabling reliable low-cost volume fabrication and delivering superior wavefront quality. Additionally, the protective window 130 preferably has a coating that admits radiation only above 1500 nm and provides solar and contamination control.

Figure 3:
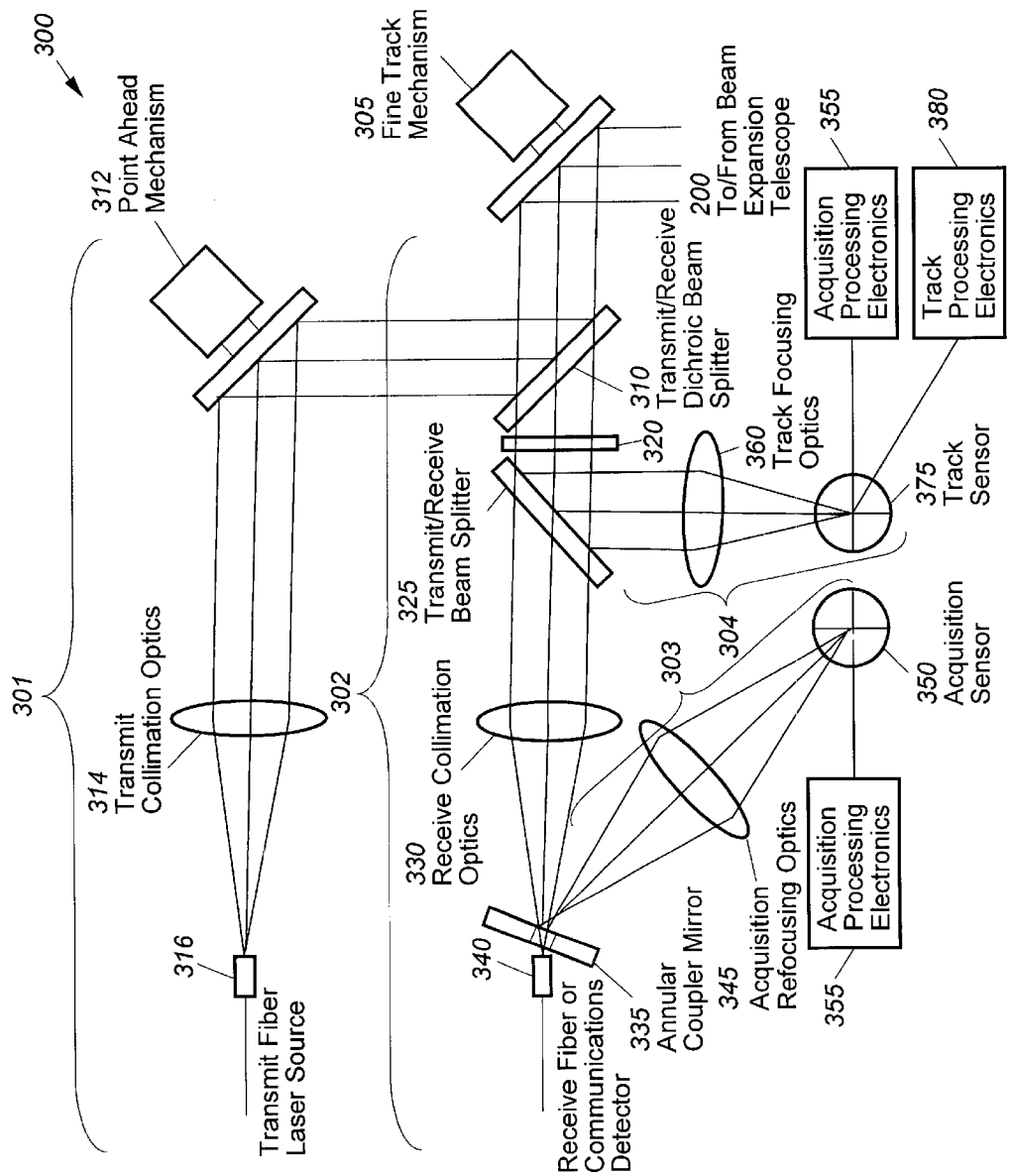
FIG. 3 illustrates the optical bench of the STS.

FIG. 3 shows the optical bench 300 of the STS 125. The optical bench 300 includes a Fine Track Mechanism (FTM) 305, a Transmit/Receive Dichroic Beam Splitter 310, transmit segment 301, a receive segment 302, an acquisition segment 303, a tracking segment 304. The transmit segment 301 includes a Point Ahead Mechanism (PAM) 312, Transmit Collimation Optics 314, and a transmit Fiber Laser Source 316. The receive segment 302 includes a Narrow Band Pass Filter (NBPF) 320, a Track/Receive Beam Splitter 325, Receive Collimation Optics 330, an Annular Coupler Mirror 335, and a Receive Fiber or Communications Detector 340. The acquisition segment 303 includes acquisition refocusing optics 345, acquisition sensor 350, and acquisition processing electronics 335. The tracking segment 304 includes track focusing optics 360, a track sensor 375, track processing electronics 380, and is connected to the acquisition processing electronic 355 similar to the acquisition processing electronic 355 in the acquisition processing segment 303.

In operation, received laser energy travels from the BET 200 of FIG. 2 to the FTM 305. The FTM 305 reflects the laser energy onto the dichroic beam splitter 310. The dichroic beam splitter 310 is substantially transparent to laser energy at the wavelength of the receive laser energy. Thus the received laser energy passes through the dichroic beam splitter 310 to the receive segment 302.

Transmitted laser energy travels from the transmit segment 301 to the dichroic beam splitter 310. The dichroic beam splitter 310 is reflective to laser energy at the wavelength of the transmitted laser energy. Thus, the transmitted laser energy is reflected from the dichroic beam splitter 310 to the FTM 305. The FTM 305 reflects the incident laser energy to the BET 200.

Both the received and transmitted laser energy thus occupy the same optical pathway from the dichroic beam splitter 310 to the FTM 305 and through the optics of the BET 200. The received and transmitted laser energy do not interfere with each other because they are at different wavelengths. Thus, both the received and transmitted laser energy may use the same optical pathway without interference and the dichroic beam splitter 310 may appear simultaneously reflective to the transmitted laser energy and substantially transparent to the received laser energy. Preferably, the FTM 305 is an electromagnetically driven, flexure-mounted mirror with integral angle sensing, providing 700 to 800 Hz bandwidth pointing control over +/−0.5 degree mechanical travel.

During operation of the transmit segment 301, the transmit fiber laser source 316 emits laser energy which passes through the transmit collimation optics 314 to the PAM 312. The PAM 312 reflects the laser energy to the dichroic beam splitter 310 where the laser energy is further reflected to the FTM 305 and then to the BET and eventually into the space environment. Both the PAM 312 and the FTM 305 may be mechanically gimbaled to provide steering of the laser energy. For fine steering and pattern steering, the PAM 312 is preferred.

Preferably, the PAM 312 is similar to the FTM 305 except for an increased field of regard to accommodate the scan angle acquisition. The scan angle required for acquisition is driven primarily by the 0.1 degree uncertainty factor in the spacecraft attitude. Preferably, the PAM 312 can be mechanically repositioned by +/−2.25 degrees to accommodate the scan angle for acquisition.

During operation of the receive segment 302, laser energy entering the BET 200 is reflected by the FTM 305 and passes through the dichroic beam splitter 310. The received laser energy then passes through the NBPF 320. The NBPF 320 is centered on the wavelength of the received laser energy and serves to reduce the level of non-signal optical noise entering from the external space environment. While the preferred embodiment of the protective window 130 of FIG. 1 preferably has a coating that admits radiation only above 1500 nm and provides solar and contamination control as noted above, the NBPF operating in conjunction with the protective window 130 may yield a more refined and band-centered filtering then the protective window 130 alone.

After passing through the NBPF 320, the laser energy impinges upon the track/receive beam splitter which redirects a portion of the total laser energy into the tracking segment 304. The remainder of the total laser energy passes through receive collimation optics 330 and impinges upon the annular coupler mirror 335. The annular coupler mirror 335 is a reflective disk with a centered circular portion of the disk removed. Laser energy impinging on the annular coupler mirror 335 within the center circular portion passes through the plane of the mirror and impinges upon the receive fiber or communications detector 340. Laser energy impinging on the annular coupler mirror 335 outside of the center circular region is reflected into the acquisition segment 303.

Turning now to the acquisition segment 303, laser energy reflected from the annular coupler mirror 335 passes through the acquisition refocusing optics 345 and impinges upon the acquisition sensor 350. The acquisition sensor 350 transforms the laser energy impinging upon it to an electrical signal. The electrical signal generated by the acquisition sensor 350 is further processed in the acquisition processing electronics 355.

Turning now to the tracking segment 304, laser energy reflected from the track/receive beam splitter 325 passes through the track focusing optics 360 and impinges upon the tracking sensor 375. Like the acquisition sensor, the tracking sensor 375 transforms impinging laser energy to an electrical signal which is further processed in the track processing electronics 380. Additionally, the electrical signal may be passed to the acquisition processing electronics 355 for further processing.

Figure 4:
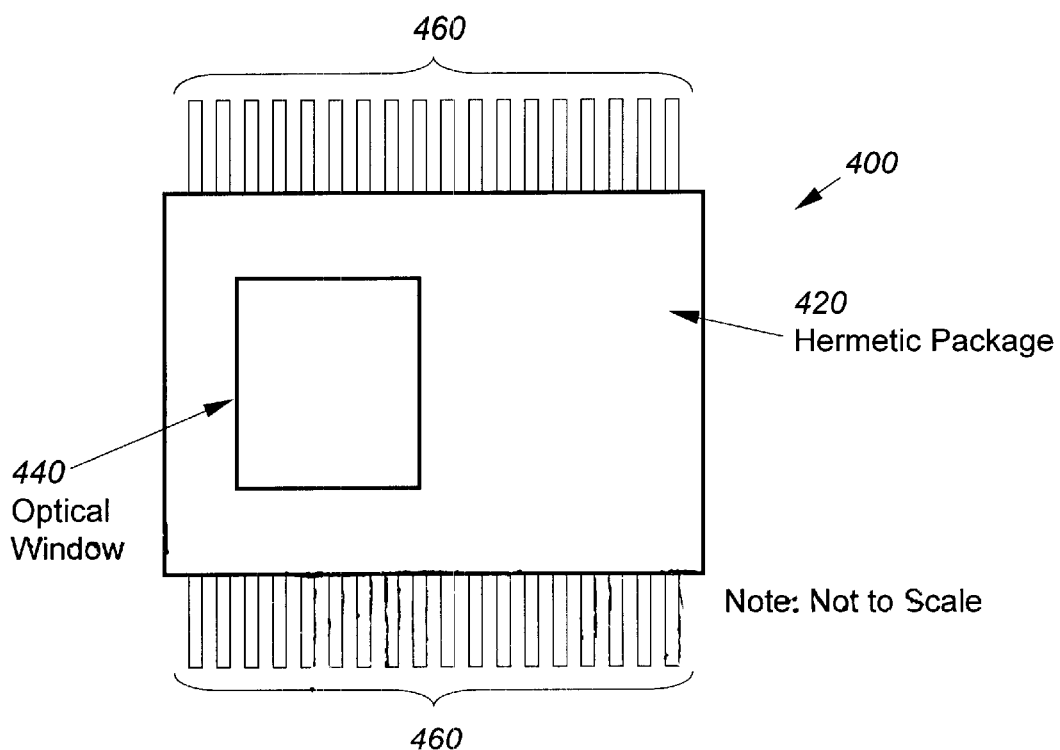
FIG. 4 is a representational drawing of the acquisition sensor 350.

FIG. 4 is a representational drawing of and acquisition sensor 350. The acquisition sensor 350 is hermetically sealed inside a hermetic package 420. The hermetic package 420 includes an optical window 440 and a number of electrical leads 460. As a representational drawing, FIG. 4 is not to scale, nor are the relative sizes of the optical window 440, the hermetic package 420 and the electrical leads 460 constrained to be as they appear in FIG. 4. Nor is the number of leads of the essence. During operation, laser energy focused by the acquisition refocusing optics 345 of FIG. 3 focuses laser energy through the optical window 440 and onto an optical sensor as will be discussed below.

Figure 5:
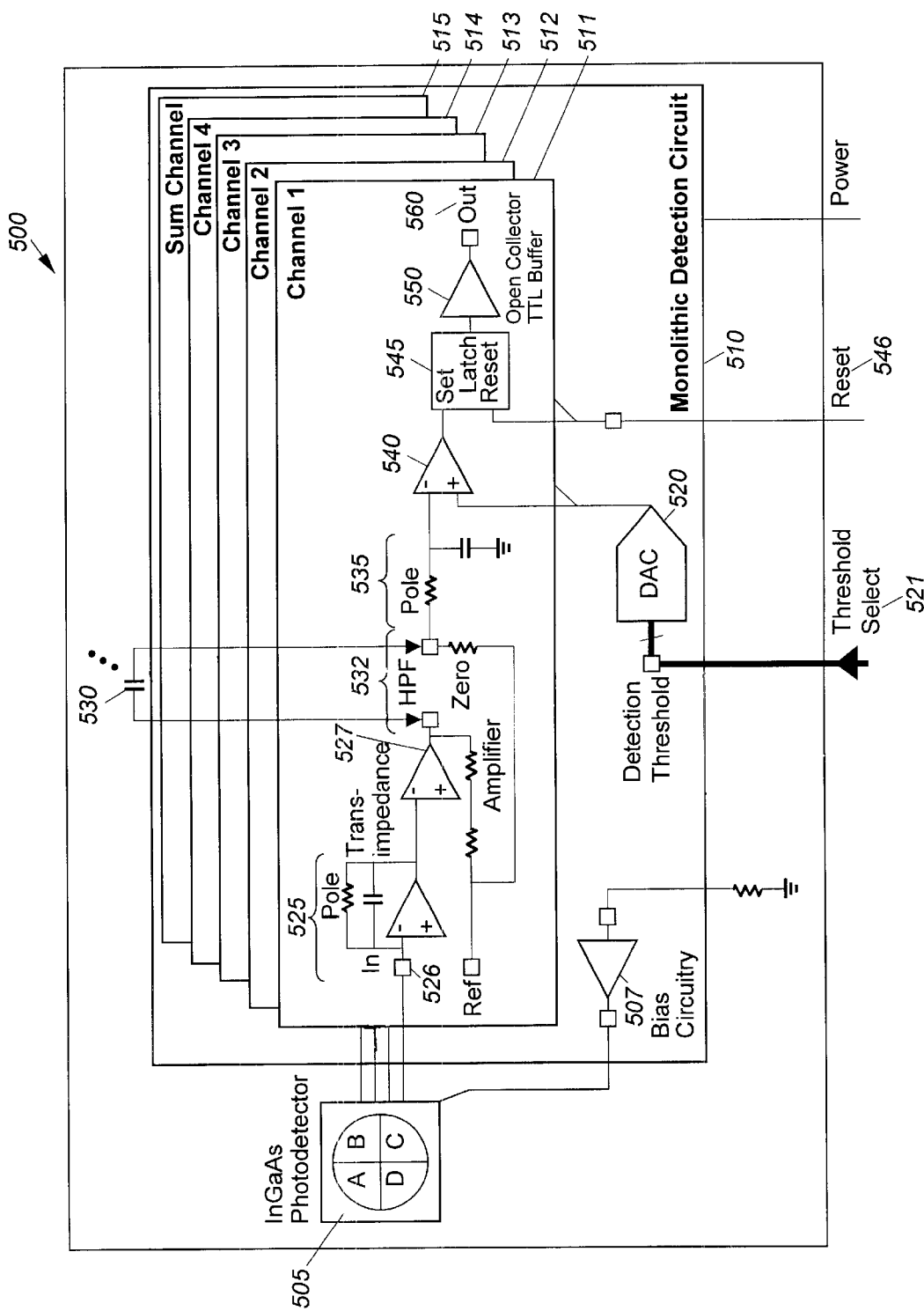
FIG. 5 illustrates a detailed schematic of a preferred embodiment of the acquisition sensor.

A detailed schematic of a preferred embodiment of an acquisition sensor 500 is shown in FIG. 5. The acquisition sensor 500 includes an InGaAs photodetector 505 and a monolithic detection circuit 510 with five channels 511–515. The monolithic detection circuit 510 also includes bias circuitry 507 for biasing the photodetector 505 and a digital to analog converter (DAC) 520. Each channel 511–515 of the monolithic detection circuit 510 includes a Low Pass Filter Trans-impedance Amplifier (TIA) 525, an amplifier 527, a High Pass Filter (HPF) 532 including an external capacitor 530, a second Low Pass Filter (LPF) 535, a comparator 540, a latch 545, and a TTL buffer 550.

The photodetector 505 is preferably circular in aspect and partitioned into four contiguous quadrants 505a–d as shown. However, for the purposes of the present invention, the photodetector may be partitioned into any number of channels. Each of the quadrants 505a–d is electrically connected to a single channel 511–515. For example, quadrant A 505a may be electrically connected to channel 1 511. Each quadrant 505a–d of the photodetector 505 responds to incident laser energy by transmitting an electrical signal to its respective channel 511–515. For example, when laser energy is incident upon quadrant A 505a of the photodetector 505, an electrical signal will be generated and sent to channel 1 511. The electrical signal has an amplitude which includes a signal component corresponding to the optical signal and a noise component corresponding to background noise. Bias circuitry 507 provides higher bandwidth performance to the photodetector 505.

Using channel 1 511 as an example, the electrical signal, in the form of an electrical current pulse, is transmitted from quadrant A 511 to the input 526 of channel 1 511. The signal is then passed through the TIA 525 to convert it to a voltage signal and to remove any undesired high frequency response such as high frequency noise, for example. The signal is then amplified through the amplifier 527. Next, the signal is passed through the HPF 532 including the external capacitor 530. The HPF 525 requires a fairly large capacitance value which is provided by the external capacitor 530. The capacitor 530 is preferably external because its physical dimensions would reduce space efficiency if included directly in the monolithic detection circuit 510.

After passing through the HPF 532, the electrical signal is then passed through a second LPF 535 to remove undesired high frequency responses such as high frequency noise, for example. The electrical signal is then passed to the comparator 540. The comparator compares the electrical signal with a threshold provided by the DAC 520. The DAC receives the threshold level command from an external threshold select 521. The threshold command is expressed as a multi-bit digital signal. The DAC 520 converts the multi-bit digital threshold command to a corresponding analog threshold level.

At the comparator 540, when the electrical signal is less than the threshold, no action is taken. When the electrical signal exceeds the threshold, a signal is transmitted to the latch 545. The latch 545 also includes an external reset 546. The output of the latch 545 is passed to the TTL buffer 550. The output of the TTL buffer 550 is provided to output 560 which may be electrically connected to further processing circuitry.

Each of the channels 1–4 511–514 connected to quadrants A–D 505a–505d of the photodetector 505 has a similar structure to the channel discussed above. However, the sum channel 515 is slightly different. For the sum channel 515, each of the HPF 532 from channel 511–514 is connected to its input to be summed and the threshold level is correspondingly changed to reflect the connection.

The acquisition sensor 500 along with the BET 200 and optical bench 300 of the STS 125 may be used to acquire a communications link between two satellites. Such an acquisition system is disclosed below. While the system below is presented in terms of a communications link between two satellites, those skilled in the art will readily appreciate that the disclosed system may be expanded to any optical link communications system such as links between, for example, multiple satellites (such as in a satellite network), a satellite and a ground station, or between ground stations.

Initially, the two satellites are installed in space. When installed, the laser communication beams of the two satellites point generally at their desired location. However, each beam is subject to a certain unknown pointing error. At installation, this pointing error may be reduced to preferably less than 0.1 degrees. However, due to the wide separation between satellites, the accuracy of the beam pointing must be increased for communication to occur.

Figure 6:
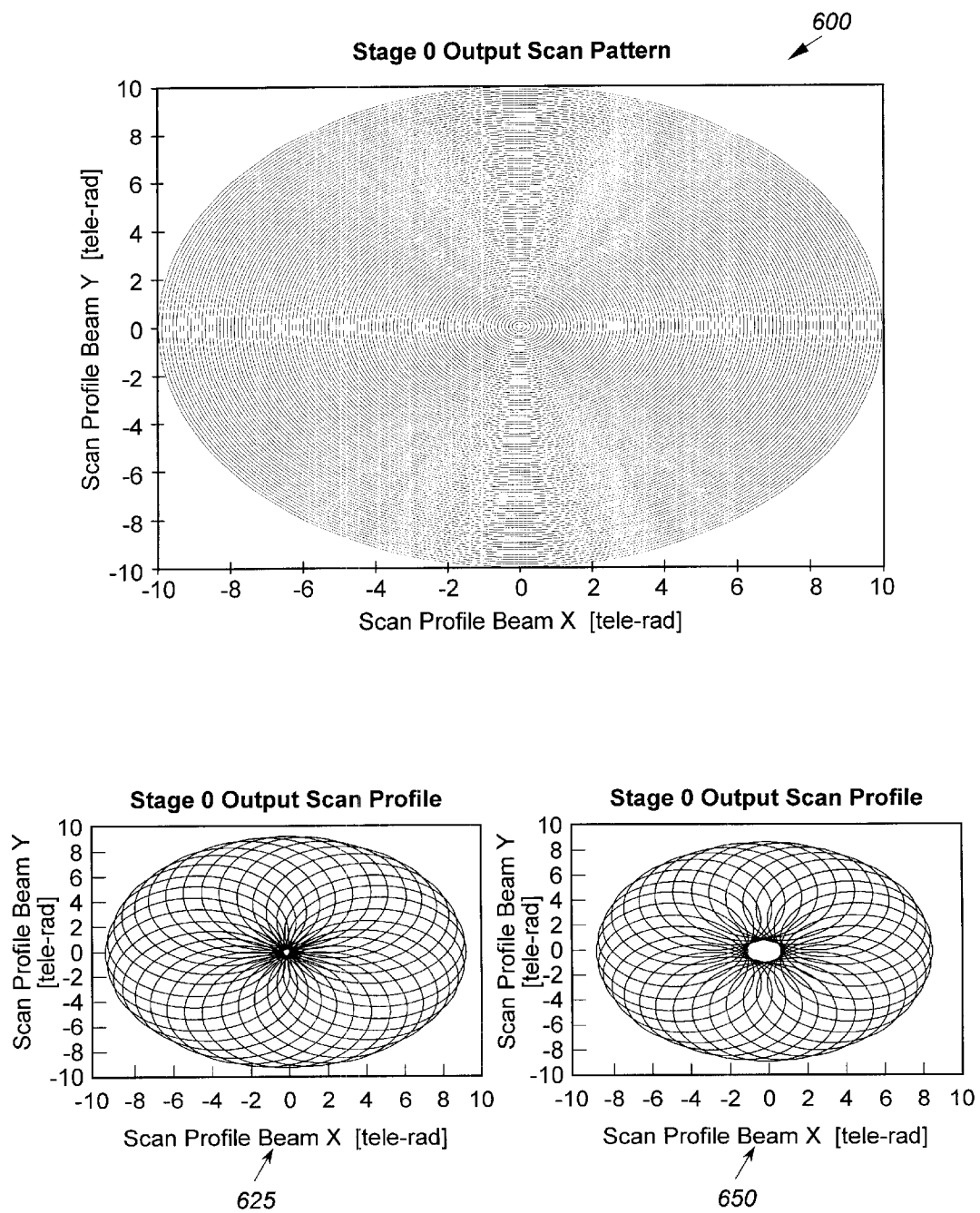
FIG. 6 illustrates the scanning patterns of the transmitted laser beam.

As shown in FIG. 6, each of the satellites begins its acquisition by sweeping its transmitted laser (from transmit laser fiber source 316 of FIG. 3) through a spiral pattern 600. The sweep is started at the center of the uncertainty area. The spiral pattern 600 is generally circular with a diameter of about 2 miliradians (about 0.11 degrees) as shown. At the center of the spiral 600, the laser beam may be swept in a rosette pattern such as the wide rosette 625 or narrow rosette 650 of FIG. 6.

Figure 7:
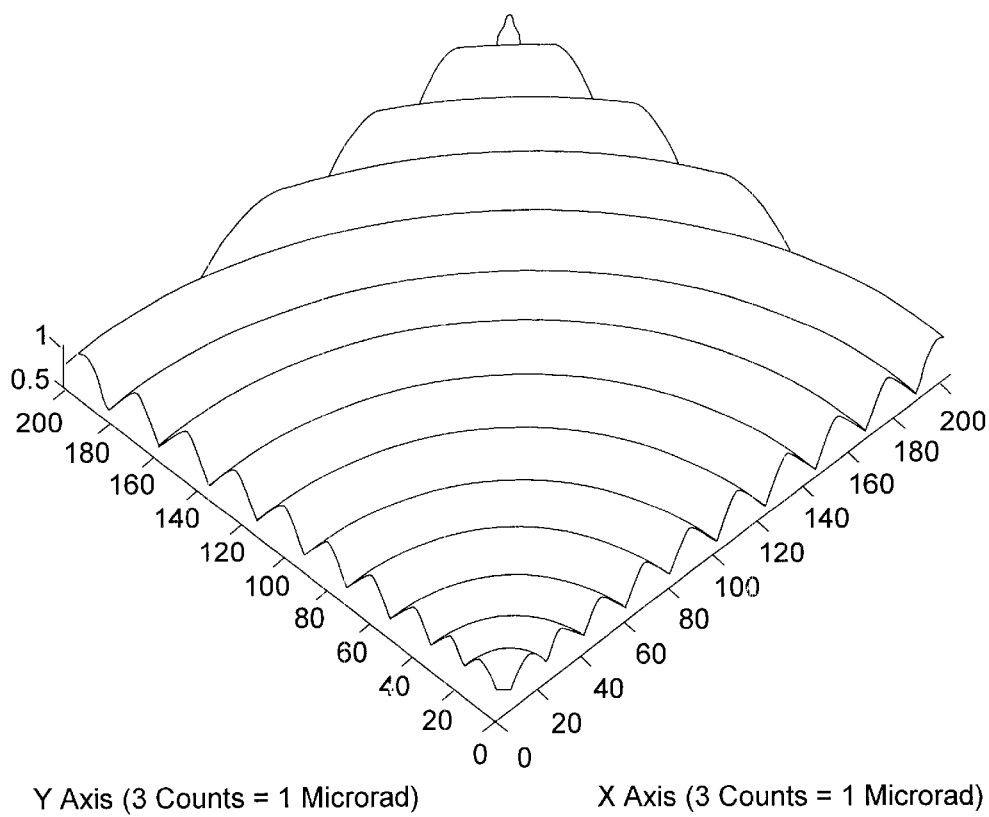
FIG. 7 shows the normalized intensity of the laser energy delivered by the spiral pattern 600.

FIG. 7 shows the normalized intensity of the laser energy delivered by the spiral pattern 600. The pattern of the spiral with respect to the beamwidth of the laser is such that the entire region of uncertainty receives at least half-power from the laser beam. Thus, the amount of laser energy incident on any point within the region of uncertainty is sufficient to trigger a response from an acquisition sensor that may be located within the region of uncertainty.

The angular velocity of the beam as it is swept through its pattern is maintained at a substantially constant rate to maximize reception by the receiving acquisition sensor. Although the spiral pattern is the preferred pattern, other patterns such as larger rosettes and more liner patterns are possible. The rosette pattern may be altered by modifying an on-board database. The rosette size, density, and linear rate may all be altered.

Figure 8:
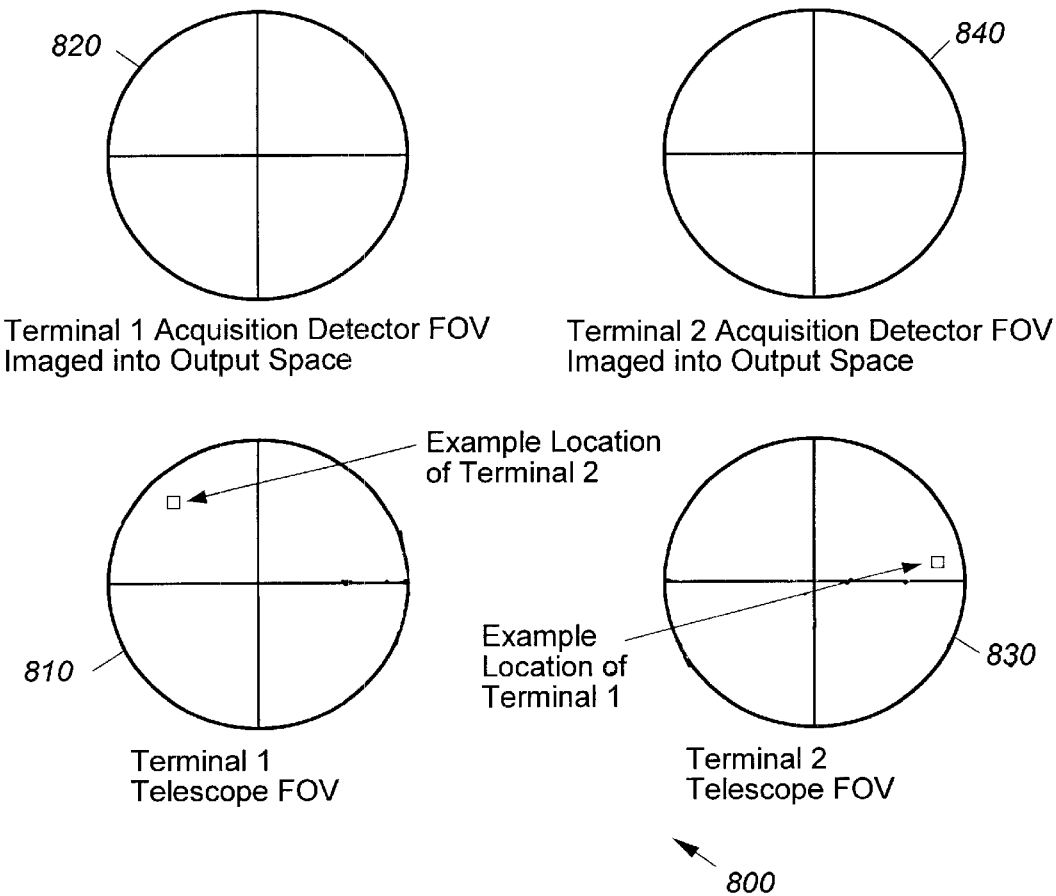
FIG. 8 shows the Field of View (FOV) of the transmitter and receiver terminals during the first step in the exemplary acquisition process of the present invention.

FIG. 8 shows the first step 800 in an exemplary acquisition process. The Field of View (FOV) 810 of the Beam Expansion Telescope 200 of terminal 1 is shown. The FOV is what is seen looking out of the telescope into space. The location of terminal 2 can be seen in Terminal 1's FOV 810. The FOV 820 of the acquisition detector of terminal 1 is also shown. The location of terminal 2 is not detected by terminal 1's acquisition detector because the laser beam of terminal 2 is not yet incident on terminal 1.

The FOV 830 of terminal 2 shows the location of terminal 1. However, the FOV 840 of the acquisition sensor of terminal 2 does not register the presence of terminal 1 because terminal 1's laser beam is not yet incident upon terminal 2.

The first step is an example of the relative positions of the terminals with respect to each other at installation. For communication to take place, the transmitted beams of the terminals must be centered in the FOVs of the receiving terminals. To accomplish this centering, at some time after installation both terminal 1 and terminal 2 begin to sweep their laser beams in the spiral or rosette patterns shown in FIG. 6. The starting time of the sweeps of terminals 1 and 2 need not be synchronized, but similar starting times may yield a faster acquisition.

Preferably, the PAM 312 of the optical bench 300 may be used to sweep the uncertainty region with the narrow communication beam of approximately 11 microradians half beam width. This beamwidth yields about 30 seconds to completely sweep the initial uncertainty area. The commanded pattern is a uniform spiral which may be corrupted by spacecraft jitters. The beam irradiance in the far field is nearly Gaussian. The result after the spiral is that the irradiance applied to each point in the uncertainty area is not constant (as shown in FIG. 7), but is more evenly illuminated than a single diffracted beacon covering the same uncertainty area. Even though the beam is narrow, it is very bright compared to the background because it contains the full output power of the terminal.

As. the lasers are swept through their respective patterns, at some point one of the lasers will sweep over the other terminal and illuminate the acquisition sensor of the other terminal. In operation, whether terminal 1 illuminates terminal 2's acquisition sensor or terminal 2 illuminates terminal 1's acquisition sensor is irrelevant.

Figure 9:
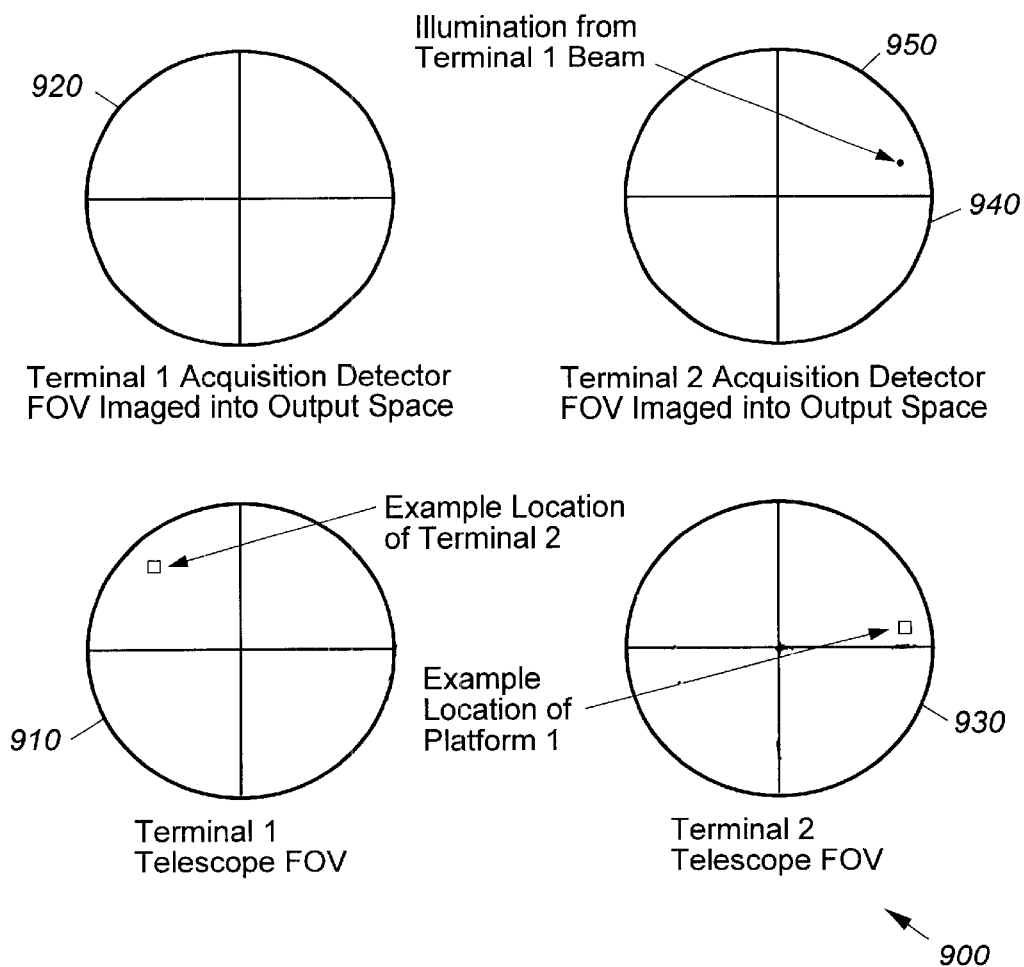
FIG. 9 shows the FOV of the transmitter and receiver terminals during the second step in the exemplary acquisition process of the present invention.

FIG. 9 shows a second step 900 of the acquisition system. In FIG. 9, the two terminals have begun to sweep their respective lasers. As the lasers are swept through their patterns, the laser of terminal 1 illuminates the acquisition sensor of terminal 2. In practice, because of the uncertainty of positioning, terminal 2's laser could have illuminated terminal 1's acquisition sensor first, but for this exemplary acquisition process terminal 1 illuminates terminal 2.

As terminal 2 is illuminated, terminal 1's FOV 910 and terminal 1's acquisition sensor's FOV 920 remain unchanged. Terminal 2's FOV 930 also remains unchanged. However, the illumination 950 from terminal 1 illuminates terminal 2's acquisition sensor. The spot illumination will flash with a time period corresponding to the scan rate and beamwidth. The acquisition sensor of terminal 2 is shown in FIG. 5. The illumination from terminal 1 falls upon quadrant B 505b of the photodetector 505. The spot produces a pulse of current from the photodetector 505 that is converted to a voltage pulse by TIA 525, amplified and passed through filtering 530, 535. The output from the filter 535 is compared to a threshold and if the output exceeds the threshold, a detection or hit is registered as having occurred in that quadrant. The registered hit signal is passed out of the acquisition sensor to control and processing circuitry (not shown).

Figure 10:
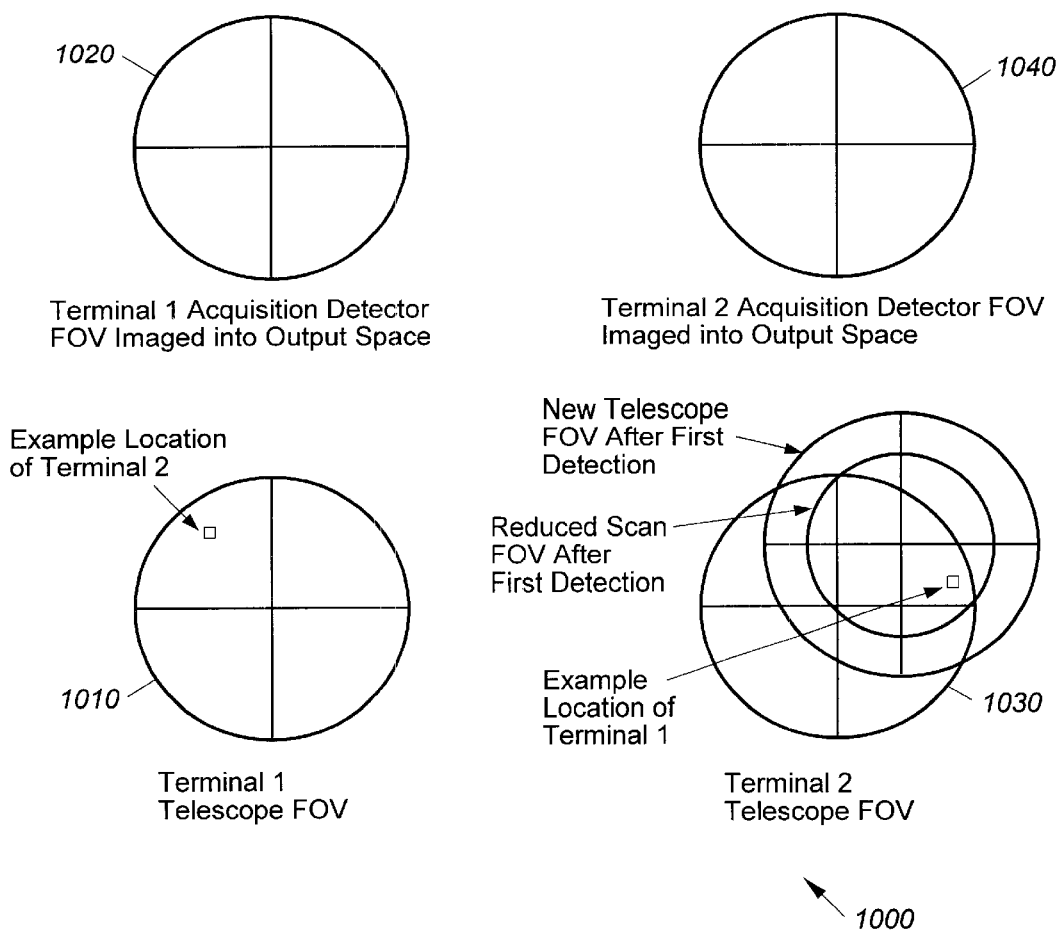
FIG. 10 shows the FOV of the transmitter and receiver terminals during the third step in the exemplary acquisition process of the present invention.

FIG. 10 illustrates a third step 1000 in the acquisition process. The acquisition sensor is divided into quadrants which correspond with the quadrants of the telescope's FOV. If a hit is detected in a certain quadrant, the detecting terminal knows that the transmitting terminal must be. in that quadrant somewhere. The uncertainty area in the transmitting terminal's location is thus reduced from four quadrants to a single quadrant. Once the hit has been detected, the terminal reorients its FOV to center on the detecting quadrant. The FOV is narrowed (the radius of the FOV is decreased) to encompass only that quadrant. Because the region of uncertainty in the FOV remains circular, the reduction in the region of uncertainty is 50% rather than the 75% reduction in uncertainty that may be expected by identifying the location of the transmitting terminal within a single quadrant.

In FIG. 10, terminal 1's FOV 1010 and terminal 1's acquisition sensor's FOV 1020 remain unchanged. However, terminal 2's FOV 1030 has been reoriented on the detecting quadrant as shown. Terminal 2's FOV remains circular, but the radius of the FOV is decreased to encompass only the detecting quadrant as shown. Terminal 2 is not aware of the location of terminal 1 in this new, decreased uncertainty area. Terminal 2 begins to sweep this new quadrant with the same spiral pattern, again beginning at the cenqter.

The center of terminal 2's FOV is controlled by the FTM 305 which may be rapidly redirected to the center of the new, smaller uncertainty area. The STS 125 is also redirected to the new uncertainty area, but the FTM 305 may be redirected more quickly. Thus, the FTM 305 may immediately begin scanning the new uncertainty area beginning at the center while the STS 125 need not complete its reorientation until the spiral pattern passes outside the area of the previous uncertainty area.

Meanwhile, terminal 1 merely keeps performing its spiral pattern while terminal 2 is detecting terminal 1's transmission and reorienting. Terminal 1 is unaware that is has been detected by terminal 2. Because terminal 1's laser hits and then keeps moving along, terminal 2's acquisition sensor's FOV 1040 no longer detects terminal 1.

Figure 11:
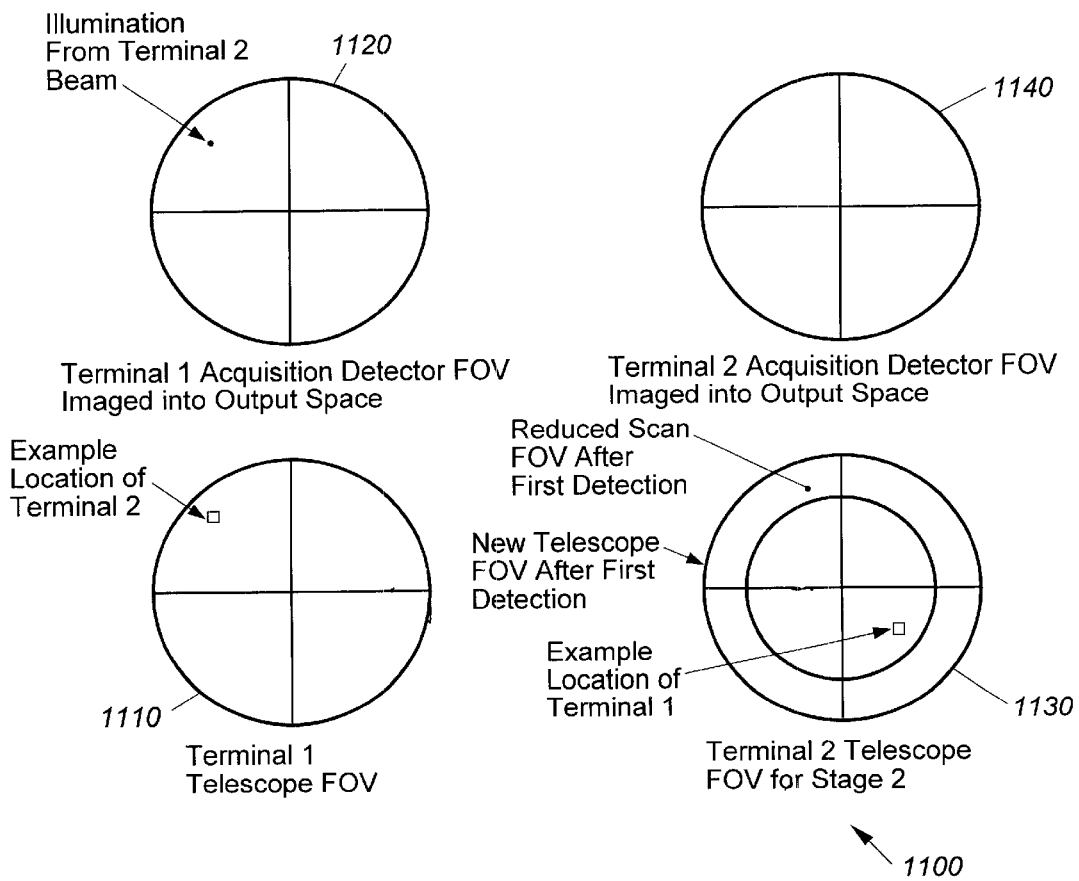
FIG. 11 shows the FOV of the transmitter and receiver terminals during the fourth step in the exemplary acquisition process of the present invention.

FIG. 11 shows a fourth step in the acquisition process. Terminal 2's FOV 1130 has now been centered on the detected quadrant and the uncertainty area of the FOV (reduced scan FOV after first detection) 1135. The location of terminal 1 remains within this new, smaller uncertainty area, but terminal 2 is unaware of the location because terminal 1's laser has not yet illuminated it again. Because terminal 1's laser has not again illuminated terminal 2, terminal 2's acquisition sensor's FOV 1140 has not recorded a hit.

However, the laser of terminal 2, while sweeping the new reduced region of uncertainty in the spiral pattern, has illuminated terminal 1. Thus, a spot corresponding to the location of terminal 2 in terminal 1's acquisition sensor's FOV 1120 is detected.

Figure 12:
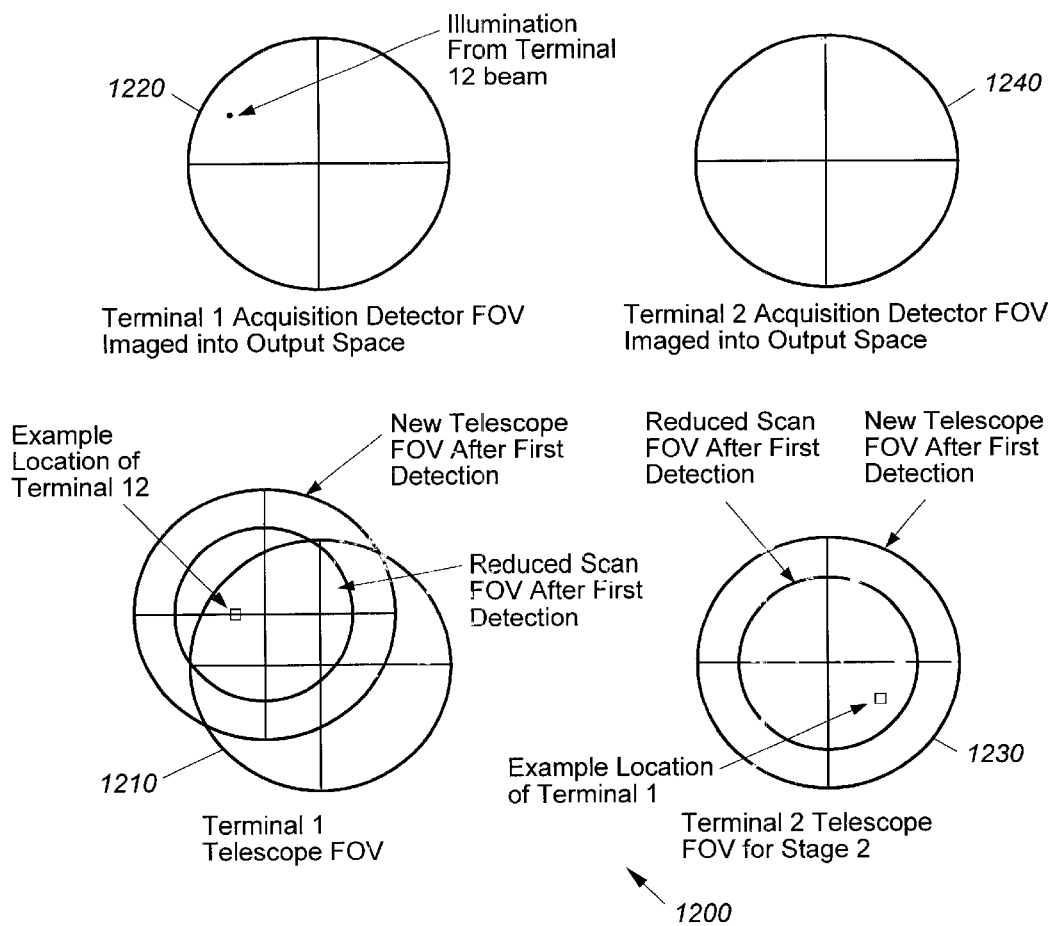
FIG. 12 shows the FOV of the transmitter and receiver terminals during the fifth step in the exemplary acquisition process of the present invention.

As shown in a fifth step 1200 of FIG. 12, once the spot appears in terminal 1's acquisition sensor's FOV 1220, terminal 1 reorients its FOV 1210 to coincide with the detection quadrant. As above, the region of uncertainty is reduced and terminal 1 begins scanning the new region of uncertainty with the spiral pattern. Meanwhile, terminal 2, unaware that it has been detected by terminal 1, continues its spiral pattern in its reduced region of uncertainty.

The sum channel of the acquisition track sensor 350 operates similarly to the quadrant sensors. Preferably, when a detection occurs in the sum channel, the FOV of the terminal is not changed, but the region of uncertainty is reduced by at least 50%. Scanning continues in this reduced uncertainty region like in the quadrant-centered regions above.

These successive steps complete the first stage in the acquisition system for both terminals. The area of uncertainty for each terminal has been reduced by 50%. In the next stage, these steps are repeated, again reducing the area of uncertainty by 50%. The stages continue until the track sensor becomes illuminated.

The acquisition process continues in a series of stages, with each stage resulting in reduced uncertainty area, and a resulting increase in the pulse rate at which the terminal illuminates an opposing terminal. During the final phases of the acquisition process, the scan area is small, preferably about 30 to 40 microradians. This yields a pulse rate of 300 Hz to 400 Hz which is sufficient to adjunct the coherence of the reference communication laser. When indicated by the communications electronics, the PAM 312 stops the scan motions and transmits a continuous beam based on the information from a track sensor. The PAM closes on the track signal and communication commences.

The acquisition process may be more generally described as acquiring a source located in a region of uncertainty, the initial region of uncertainty being the initial pointing error. Successive stages of the acquisition process minimize this region of uncertainty. Each uncertainty region may be divided into subdivisions, each corresponding to a channel of the photodetector as well as a region in space. That is, the channel receiving an optical beam depends on the location of the terminal in space.

Figure 13:
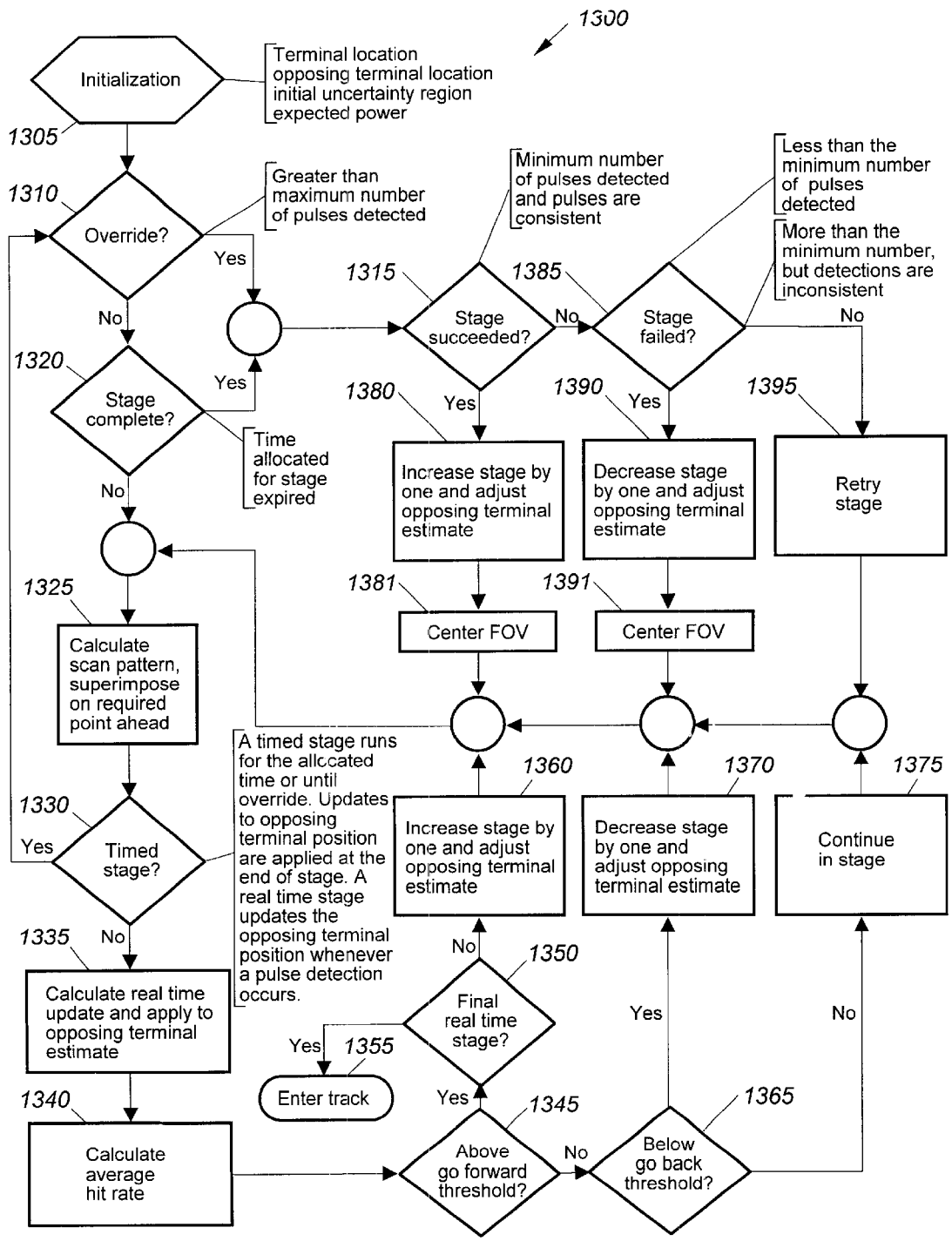
FIG. 13 is a flowchart 1300 illustrating the acquisition system of the present invention.

FIG. 13 is a flowchart 1300 illustrating the acquisition system. The satellite is initialized at initialization step 1305. The satellite is provided with its location, the general location of the opposing terminal, the initial uncertainty region, and the expected power. The satellite then positions its transmit beam to the desired opposing terminal location and begins scanning. The expected power information is used to determine the threshold for received laser energy to determine when a hit has occurred.

Next, the terminal keeps scanning unless a greater than maximum number of pulses is detected at override step 1310. If a greater than maximum number of pulses is detected, then the process proceeds to stage succeeded step 1315. If a greater than maximum number of pulses is not detected the terminal determines if the stage is complete at step 1320. The stage is complete, even if greater then the maximum number of pulses have not been detected, if the time allocated for the stage has expired. If the stage is complete, the process proceeds to stage succeeded step 1315. If the stage is not complete, the process proceeds to step 1325 and the scan pattern is calculated and superimposed on the PAM 312 and scanning continues.

A timed stage runs for the allocated time or until override. Updates to opposing terminal information are applied at the end of a stage. A real time stage updates the opposing terminal positions whenever a pulse detection occurs. Thus, at step 1330, if the stage is timed, the process proceeds back to step 1310. If the stage is not timed, the process proceeds to step 1335 and a real time update is calculated and applied to the opposing terminal estimate.

The average hit rate is then calculated at step 1340. At step 1345, the average hit rate is compared with the go forward threshold. If the hit rate is above the go forward threshold, the process proceeds to step 1350. At step 1350, the process determines if the current stage is the final real time stage. If so, the process proceeds to the tracking stage 1355. If not, the process proceeds to step 1360 and the stage number is increased by one and the opposing terminal estimate is adjusted. The process then proceeds back step 1325.

At step 1345, if the hit rate is not above the go forward threshold, the process proceeds to step 1365. At step 1365, if the hit rate is below the go back threshold, then the process proceeds to step 1370 and the stage is decreased by one and the opposing terminal location is re-estimated. The process then proceeds to step 1325. If the hit rate is not below the go back threshold then the stage is continued at step 1375. The process then proceeds to step 1325.

Going back to step 1315, if the minimum number of pulses are detected and the pulses are consistent, then the stage has succeeded and the process proceeds to step 1380. At step 1380 the stage is increased by one and the opposing terminal estimate is readjusted. The process then proceeds first to step 1381 where the FOV is centered and then to step 1325. If the minimum number of pulses are not detected or the pulses are not consistent, then the stage has failed and the process proceeds to step 1385.

At stage 1385, if less than the minimum number of pulses are detected then the stage has failed and the process proceeds to step 1390. At step 1390, the stage is decreased by one and the opposing terminal estimate is readjusted. The process then proceeds first to step 1391 where the FOV is centered and then to step 1325.

At stage 1385, if more then the minimum number of pulses have been detected but the detections are inconsistent, the process proceeds to step 1395 and the stage is re-tried. The process then proceeds to step 1325.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. In a communication terminal for acquiring an optical beam transmitted by a source located in a region of uncertainty containing subdivisions, an acquisition sensor for determining the subdivision of the region in which the source is located comprising;

a multi-channel photodetector, at least some of the channels being arranged so that the channel receiving the optical beam depends at least on part on the subdivision in which the source is located, the photodetector converting at least a portion of the optical beam to a corresponding received signal having a signal component, a noise component, and an amplitude;

channel circuitry responsive to the received signal including;

a threshold circuit connected to generate a threshold signal;

a comparator connected to compare the amplitude of the received signal to the threshold signal and to generate a result signal indicating the results of the comparison; and at least one filter connected to lower the noise component in the received signal.

2. The acquisition sensor of claim 1 wherein the terminal is aligned within a second region of uncertainty to maintain tracking and wherein each channel of the photodetector defines a field of view representing a region larger than the second region of uncertainty.

3. The acquisition sensor of claim 1 further including a latch for storing the result signal.

4. The acquisition sensor of claim 1 wherein the threshold signal is an analog signal and wherein the threshold circuit comprises;

a source of a digital signal representing a threshold level; and a digital to analog converter for converting the digital signal to said threshold signal.

5. The acquisition sensor of claim 4 wherein said source is remote from said acquisition sensor.

6. The acquisition sensor of claim 1 wherein said multi-channel photodetector and said channel circuitry are contained within a single hermetically sealed packaging including an optical window through which said optical beam passes.

7. The acquisition sensor of claim 1 wherein said photodetector comprises an InGaAs photodetector.

8. The acquisition sensor of claim 1 wherein said optical beam is received by said photodetector from a communication beam instead of a dedicated beacon.

9. The acquisition sensor of claim 1 wherein the optical beam received by the acquisition sensor is also received by a tracking sensor.

10. The acquisition sensor of claim 1 wherein the optical beam received by the acquisition sensor passes through the same telescope as a transmitted signal.

11. The acquisition sensor of claim 1 wherein said multi-channel photodetector is comprised of four quadrants, each quadrant associated with channel circuitry receiving signals from said quadrant.

12. The acquisition sensor of claim 11 further including a sum channel receiving signals from the channel circuitry of each quadrant of said photodetector.

13. The acquisition sensor of claim 11, each channel further including a latch for storing the result of the comparison of the amplitude of the received signals to the threshold for that channel.

14. The acquisition sensor of claim 11 further including a digital to analog converter for converting a digital threshold level to an analog signal level and supplying said analog signal level to said comparator.

15. The acquisition sensor of claim 14 wherein the threshold level is externally adjustable.

16. The acquisition sensor of claim 11 wherein said photodetector and said channel circuitry are contained within a single hermetically sealed packaging including an optical window through which the received optical beam passes.

17. The acquisition sensor of claim 11 wherein said photodetector comprises an InGaAs photodetector.

18. The acquisition sensor of claim 11 wherein said optical beam is received by said photodetector from a communication beam instead of a dedicated beacon.

19. The acquisition sensor of claim 11 wherein said optical beam received by the acquisition sensor is also received by a tracking sensor.

20. The acquisition sensor of claim 11 wherein said optical beam received by said acquisition sensor passes through the same telescope as a transmitted signal.

* * * * *